(12) United States Patent
Prediger

(10) Patent No.: US 12,679,345 B2
(45) Date of Patent: Jul. 14, 2026

(54) DRIVABLE PATH DETERMINATION FOR A VEHICLE

(71) Applicant: Aptiv Technologies AG, Schaffhausen (CH)

(72) Inventor: Christian Prediger, Lindlar (DE)

(73) Assignee: Aptiv Technologies AG, Schaffhausen (CH)

( * ) Notice: Subject to any disclaimer, the term of this patent is extended or adjusted under 35 U.S.C. 154(b) by 265 days.

(21) Appl. No.: 18/539,038

(22) Filed: Dec. 13, 2023

(65) Prior Publication Data

US 2024/0190422 A1     Jun. 13, 2024

(30) Foreign Application Priority Data

Dec. 13, 2022     (EP) ..................................... 22213178

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 50/0097* (2013.01); *B60W 50/14* (2013.01); *B60W 2050/143* (2013.01); *B60W 2050/146* (2013.01); *B60W 2420/408* (2024.01); *B60W 2554/00* (2020.02); *B60W 2556/20* (2020.02); *B60W 2556/50* (2020.02)

(58) Field of Classification Search
CPC ............. B60W 30/09; B60W 30/0956; B60W 50/0097; B60W 50/14; B60W 2050/143; B60W 2050/146; B60W 2420/408; B60W 2554/00; B60W 2556/20; B60W 2556/50; B60W 30/095; G01S 2013/9318; G01S 13/931; G01S 2013/9322; G01S 13/86; G01S 13/865; G01S 17/86; G01S 17/931; G01S 19/42; G01C 21/343
See application file for complete search history.

(56) References Cited

U.S. PATENT DOCUMENTS 10,796,201 B2   10/2020   Li et al.
10,803,328 B1   10/2020   Bai et al.
(Continued)

FOREIGN PATENT DOCUMENTS

| CN | 112793567 | * 5/2021 | ............ B60W 30/09 |
| DE | 102011086299 | * 5/2013 | ............ B60W 50/14 |
| EP | 3929824 A2 | 12/2021 | |

OTHER PUBLICATIONS

Extended European Search Report for EP Application No. 22213178. 1, Mailed May 31, 2023, 7 pages.
(Continued)

*Primary Examiner* — Brodie J Follman
(74) *Attorney, Agent, or Firm* — Miller Johnson

(57) ABSTRACT

A computer-implemented method for determining a drivable path for a vehicle during a ride includes obtaining sensor data. The sensor data indicates a perceived obstacle associated with a geographical location. The method includes retrieving, from a data storage, data associated with the perceived obstacle. The data includes a confidence score. The method includes, in response to the confidence score being above a threshold, determining the perceived obstacle as overdrivable for the vehicle.

18 Claims, 7 Drawing Sheets

(51) Int. Cl.
    *B60W 50/00*       (2006.01)
    *B60W 50/14*       (2020.01)

(56) References Cited

U.S. PATENT DOCUMENTS

| | | | |
|---|---|---|---|
| 2016/0139262 A1* | 5/2016 | Staynov | G01S 13/931 |
| 2017/0176990 A1 | 6/2017 | Keller et al. | |
| 2019/0041497 A1* | 2/2019 | Smith | G01S 7/412 |
| 2020/0020986 A1* | 1/2020 | Chen | G05D 1/024 |
| 2020/0241530 A1* | 7/2020 | Caveney | G05D 1/0088 |
| 2020/0264609 A1 | 8/2020 | Hammond et al. | |
| 2021/0139022 A1* | 5/2021 | Tao et al. | B60W 60/0027 |

OTHER PUBLICATIONS

Xie et al., "Real-Time LiDAR Point Cloud Semantic Segmentation for Autonomous Driving," Electronics 2022, 11, 11, https://www.mdpi.com/2079-9292/11/1/11/pdf last accessed Dec. 7, 2023), 13 pages.

Rottmann et al., "Detection of False Positive and False Negative Samples in Semantic Segmentation" arXiv:1912.03673v1 [cs.CV] Dec. 8, 2019 (https://arxiv.org/pdf/1912.03673.pdf last accessed Dec. 7, 23), 6 pages.

Hughes et al., "DriveSpace: Towards context-aware drivable area detection," Electronic Imaging, 2019, 10 pages.

\* cited by examiner

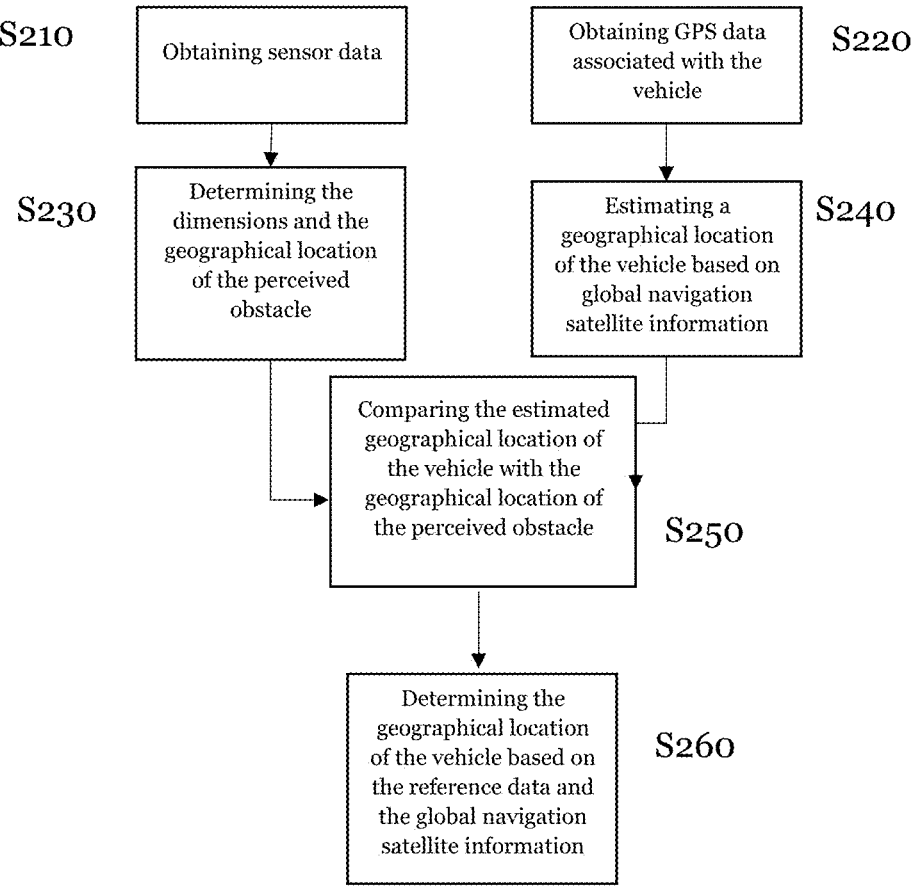

S210

Obtaining sensor data

Obtaining GPS data associated with the vehicle

S220

S230

Determining the dimensions and the geographical location of the perceived obstacle Estimating a geographical location of the vehicle based on global navigation satellite information

S240

Comparing the estimated geographical location of the vehicle with the geographical location of the perceived obstacle

S250

Determining the geographical location of the vehicle based on the reference data and the global navigation satellite information

DRIVABLE PATH DETERMINATION FOR A VEHICLE

CROSS-REFERENCE TO RELATED APPLICATIONS

This application claims priority to EP No. 22 213 178 filed Dec. 13, 2022, the entire disclosure of which is incorporated by reference.

FIELD

The present disclosure relates to a computer-implemented method, an apparatus, a vehicle, a system, and a computer program for determining a drivable path for a vehicle during a ride.

BACKGROUND

Nowadays, vehicles (cars, motorbikes, ships, robots etc.) are oftentimes operated using vehicle assistance systems (e.g., such as an Advanced Driving Assistance System (ADAS)) to provide some degree of driving assistance to the driver. Additionally, the vehicle assistant system may also be able to control a vehicle semi-autonomously or even fully autonomously. This requires that the vehicle assistant system has sufficient knowledge of its surroundings, in particular of obstacles such as other vehicles, pedestrians, guardrails etc. to avoid collisions and allowing the vehicle to navigate safely through its surrounding environment. Typically, sensors are used to obtain the required data to determine objects, to classify the surrounding in the environment of a vehicle and to determine a drivable path or area for the vehicle.

However, sensors, such as radar-based or LiDAR-based systems, may report an object in the surrounding of a vehicle as a false positive. For example, in a traffic situation, cracks and bumps in a road are often determined as larger objects that might cause a collision with the vehicle, and the drivable path would be determined accordingly such that the alleged large object is avoided. False warnings or speed reductions based on such false positive determinations could be inconvenient for the driver. In fact, the false determinations could even cause dangerous situations in a traffic environment. For example, if the drivable path is adjusted based on a crack in the road, in a semi-autonomous or fully autonomous control of the vehicle, a sudden steering maneuver or breaking of the vehicle could cause a collision with other vehicles that are not prepared for such a behavior. Consequently, it is desired to provide a method that avoids false positive detections reliably.

In EP 3929824 A2, techniques are disclosed for using neural network architectures to estimate predictive uncertainty measures, which quantify how much trust should be placed in the deep neural network (DNN) results. The techniques include measuring reliable uncertainty scores for a neural network, which are widely used in perception and decision-making tasks in automated driving. The uncertainty measurements are made with respect to both model uncertainty and data uncertainty and may implement Bayesian neural networks or other types of neural networks.

In U.S. Ser. No. 10/803,328 B1, systems and methods for detecting objects are provided. In one example, a computer-implemented method includes receiving sensor data from one or more sensors configured to generate sensor data. The method includes inputting the sensor data to a machine-learned model that generates a class prediction and an instance prediction for each of a plurality of portions of the sensor data. The instance prediction includes an energy value based on a distance to at least one object boundary. The machine-learned model can be trained to generate a common energy value to represent the at least one object boundary. The method includes generating as outputs of the machine-learned model, an instance prediction and a class prediction corresponding to each of the plurality of portions of the sensor data. The method includes generating one or more object segments based at least in part on the instance predictions and the class predictions.

SUMMARY

While the above prior art methods provide means to reduce the likelihood of false positives, these approaches depend on the reliability of the sensor data and a corresponding machine learning algorithm. Consequently, these methods do not provide a solution to a problem where the initial sensor data is not reliable. Moreover, the processing power of executing the above additional processes is relatively high. In addition, the methods known in the art do not take into account the fact that many drivers drive the same route regularly, e.g., for commuting and thus passing the bumps and cracks (and other kinds of objects that may lead to false positive detections) quite often. Hence, it may happen that the methods known in the art classify an object as overdrivable during a first ride but classify it as non-overdrivable during a second ride. Furthermore, if an object has reliably been identified as overdrivable, it is cumbersome and error-prone to have it again classified during a further pass-by.

Against this background, an object of the present invention is to provide an improved method for determining the drivable path for a vehicle during a ride.

In an aspect, a computer-implemented method for determining a drivable path for a vehicle during a ride comprises the steps of: obtaining sensor data indicating a perceived obstacle associated with a geographical location; retrieving, from a data storage, data associated with the perceived obstacle, the data comprising a confidence score; and if the confidence score is above a threshold, determining the perceived obstacle as overdrivable for the vehicle.

With the above it is possible to detect and ignore false positive detections of obstacles. For example, the sensor data may indicate that a perceived obstacle, e.g., a non-overdrivable static obstacle, has a dimension or structure that indicate that it is non-overdrivable for the vehicle, while the obstacle is in fact overdrivable. In such examples, data retrieved from a storage may indicate by using a confidence score, e.g., determined during a previous pass-by, that the perceived obstacle, e.g., an area occupied by the obstacle, may be considered as drivable path for the vehicle. Hence, the method benefits from knowledge gathered during previous rides with respect to the perceived obstacle and may use this knowledge to prevent false positive detections.

In a further aspect, the method comprises: if the perceived obstacle is overdriven and/or if the obtained sensor data indicate that the perceived obstacle is overdrivable, increasing the confidence score in the data storage.

When the vehicle overdrives the perceived obstacle, which is possible if the obstacle is just a bump or a crack in a road, the confidence score is increased to express the fact that the obstacle is actually overdrivable. Similarly, the confidence score may be increased when the sensor data allows to draw the conclusion that the perceived obstacle can be overdriven. Hence, it is possible to increase the confidence score each time the vehicle passes or drives over the perceived obstacle. With this, it can be learned that the obstacle is in fact overdrivable. Therefore, if the vehicle once again comes across the perceived obstacle during another ride or pass-by, it may determine, based on the confidence score, that the perceived obstacle is actually overdrivable and may thus include the location of the obstacle in its path planning.

In a further aspect, the method comprises: if the confidence score is below the threshold, determining the perceived obstacle as non-overdrivable for the vehicle.

If sensor data is obtained that indicate an obstacle and the corresponding confidence score is below a threshold value, the obstacle is considered non-overdrivable. In other words, if the confidence score is too low, it may not allow to resolve or prevent a false positive detection. The threshold value may be low because the obstacle has neither been previously overdriven nor has the sensor data allowed to draw a reliable conclusion that the perceived obstacle could be overdriven. If the confidence score is low, the obstacle is considered as non-overdrivable such that wrong determinations as overdrivable are prevented.

In a further aspect, the method comprises determining one or more characteristics of the perceived obstacle based on the sensor data, wherein the one or more characteristics comprises at least one of: a type of the perceived obstacle, a shape of the perceived obstacle, a size of the perceived obstacle, a distance between the vehicle and the perceived obstacle, a height of the perceived obstacle, and/or a geographical location of the perceived obstacle.

In another aspect, the method further comprises storing or updating the determined one or more characteristics of the perceived obstacle in the data storage.

Determining one or more of the aforementioned characteristics of the perceived obstacle allows for a more precise determination whether the obstacle is actually overdrivable or not.

In a further aspect, the geographical location of the perceived obstacle is determined based on a current geographical location of the vehicle, according to global navigation satellite information, and/or by using radar-based localization.

Determining and storing the characteristics, specifically the geographical location, may allow to identify the characteristics and the confidence score of the obstacle stored in the data storage. Hence, the geographical location may act as a key allowing to identify the data in the data storage associated with the perceived obstacle. In other words, if an obstacle has been detected during a previous ride and has been assigned a confidence score, then, during a next pass-by, the geographical location of the vehicle may be used to search the data storage and to determine whether data, including the confidence score, for the perceived obstacle created during a previous ride already exists. This facilitates retrieving from the data storage the other characteristics and/or the confidence score associated with the perceived obstacle.

The geographical location may be determined based on global navigation satellite information, such as GPS, GALILEO or GLONASS information.

In yet another aspect, the method further comprises determining the drivable path including the geographical location of the perceived obstacle if it has been determined that the perceived obstacle is overdrivable; or determining the drivable path excluding the geographical location of the perceived obstacle if it has been determined that the perceived obstacle is non-overdrivable.

If the perceived obstacle is considered overdrivable, which may be the case if the confidence score is above a threshold, then the geographical location associated with the perceived obstacle may be included in the drivable path. In contrast, if the perceived obstacle is considered non-overdrivable, then the geographical location associated with the perceived obstacle is not included in the path. This ensures that only overdrivable objects are part of the planned path.

In another aspect, determining the drivable path is based on a drivable pass predictor.

Predicting the path based on a predictor provides for an efficient way to reliably determine the path for the vehicle.

In another aspect, the data storage is an internal storage of the vehicle and/or a remote storage, such as a cloud storage, accessible by the vehicle.

Using an internal storage may allow a fast retrieval of the data associated with a perceived obstacle without having to rely on working wireless connections to external storages located on remote servers. Using a remote storage may allow sharing the information of a perceived obstacle, specifically the confidence score and the geographical location, with other vehicles/drivers or one may benefit from information/confidences scores determined by other vehicles. Furthermore, having the data stored in a remote storage accessible by the vehicle provides for an increased amount of storage space.

In a further aspect, the step of obtaining sensor data comprises identifying the perceived obstacle using an object detection and/or semantic segmentation algorithm, using an artificial intelligence, AI, engine.

The combined approach of object detection and semantic segmentation increases the reliability of the determination of the characteristics of the perceived object. AI engines are particularly well suited for tasks like determining the characteristics of a perceived obstacle.

In another aspect, the method further comprises determining an operating instruction for the vehicle based on the determined drivable path affecting a function of a vehicle assistance system, wherein the function comprises one or more of displaying the determined drivable path on a display of the vehicle, triggering a warning, and/or affecting control of the vehicle.

The above allows to assist a user of a vehicle by using the method of determining the drivable path of the vehicle during a ride. For example, using this information, objects can be automatically avoided in a traffic situation and/or the user may be warned from obstacles that might intersect the path of the vehicle. Collisions may be avoided by initiating a control command effecting the control of the vehicle, like an emergency brake or the like.

A further aspect of the invention relates to an apparatus comprising means configured to perform the method as outlined above.

Another aspect of the invention relates to a computer program comprising instructions, which when executed by a computing system, causing the computing system to perform the method as outlined above.

Yet another aspect of the invention relates to a vehicle comprising the aforementioned apparatus.

Finally, another aspect of the invention relates to a system comprising either one or more apparatuses as outlined above or one or more of the aforementioned vehicles, wherein the system further comprises a remote storage, a cloud storage, accessible by one or more vehicles.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Various aspects of the present invention are described in more detail in the following by reference to the accompanying figures without the present invention being limited to the embodiments of these figures.

FIG. 3 shows a method for determining the current location of the vehicle, according to a further aspect.

In the drawings, reference numbers may be reused to identify similar and/or identical elements.

DETAILED DESCRIPTION

Introduction

In the following, aspects of the present invention are described in more detail.

Overview of the Method

Figure 1A:
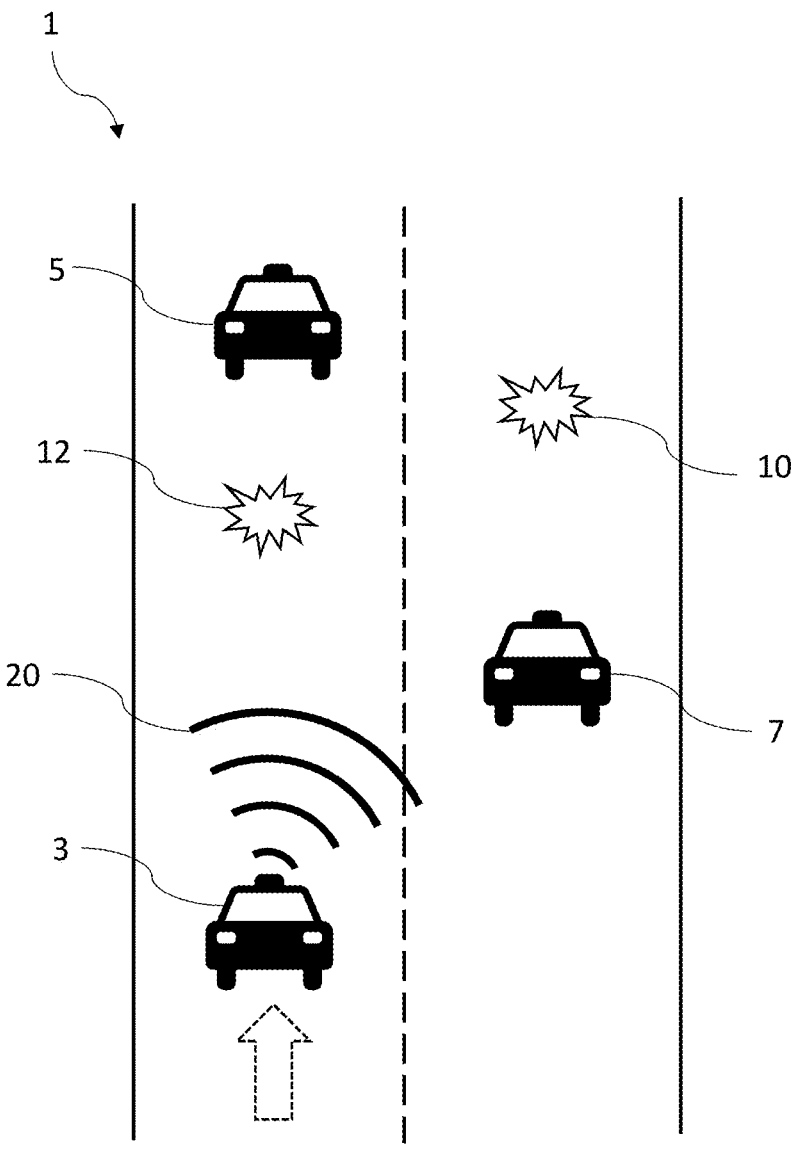
FIG. 1A depicts a traffic scenario used for describing aspects of the present invention.

FIG. 1A depicts a vehicle 3 driving on a road 1 with road boundaries (indicated by the black vertical lines extending from top to bottom) and two cracks 10 and 12 in the surface of road 1. In addition, two further vehicles 5 and 7 are driving on the road 1. The driving direction of all three vehicles 3, 7 and 5 is indicated by the dashed arrow.

Vehicle 1 has a radar sensor (not shown) mounted to it and performing radar measurements as indicated by the radar signal 20. The radar signal may perceive the vehicles 5 and 7 as impassable and thus as non-overdrivable obstacles. If, for example, vehicle 3 approaches the vehicles 5 and 7 too fast, and due to the fact that the radar signal 20 has detected the vehicles 5 and 7 as impassable or non-overdrivable obstacles, an ADAS of vehicle 3 may be instructed to initiate an emergency break or to determine a driving path, which circumvents the vehicles 5 and 7 to avoid a collision.

The radar signal 20 may also recognize the cracks 10 and 12 as non-overdrivable obstacles, while they are in fact overdrivable. Such a detection is herein called a false positive detection (or simply false positive). A false positive detection, for example with respect to crack 12, which is located in the vehicle's driving path, might cause a common ADAS to correct its driving path or to perform an action like an emergency break, or a driving path adjustment. Such a false positive detection could happen every time when vehicle 3 comes along the shown route and approaches crack 12.

According to an aspect of the present disclosure, when vehicle 3 overdrives crack 12, although it has been determined as non-overdrivable, this information is stored in a storage (either included in the vehicle 3 or in a remote storage accessible via a mobile communication link) in terms of a confidence score (e.g., a value ranging from 0 to 100). The confidence score may be stored in the storage associated with its geographical location (e.g., derived from a global navigation satellite system (GNSS) sensor, like a GPS sensor, of the vehicle 3).

Then, during another ride along the same route (for example a commute route taken every working day), the radar signal 20 of vehicle 3 may again detect crack 12 as a non-overdrivable obstacle. Based on the geographical location, the ADAS (or another system component) of vehicle 3 may check whether data of the perceived obstacle has been stored in the storage. If so, it may receive the data associated with the perceived obstacle and may check its confidence score. If the confidence score is above a threshold (e.g., 70 when assuming an overall range of 0 to 100), the ADAS knows that the perceived obstacle 12 is a false positive detection and may ignore it or may use this knowledge to adapt is path planning. It may, for example, simply overdrive crack 12 without performing any specific action.

Every time the vehicle 3 overdrives crack 12 and has detected it as a non-overdrivable obstacle, the confidence score is increased, and the corresponding value is updated in the storage. Hence, the higher the confidence score, the more reliable the assumption that it is a false positive detection.

Besides crack 12, as can be seen from FIG. 1a, a further crack 10 is in the surface of road 1. However, in the present example scenario according to FIG. 1a, this crack, which may also be perceived as a non-overdrivable obstacle by radar signal 20, is not overdriven by vehicle 3 as it is not in his driving path. However, based on an analysis of the characteristics of the radar signal 20, it may also be determined as overdrivable. In this case, the confidence score is increased, too. To determine the exact geographical location of crack 10, the vehicle 3 may determine its own location using its GNSS sensor and may use radar-based localization to determine the position of crack 10 relative to vehicle 3. This allows to determine the absolute location of crack 10, which may then be used for storing (or updating) the corresponding confidence score, which is stored in combination with the location information of crack 10.

In the example of FIG. 1a, the vehicles 3, 5 and 7 are shown as cars. However, it is also possible that the vehicles 3, 5 and 7 are motorbikes or any other type of road vehicle. It is further possible to apply the aforementioned teachings to other vehicles moving on different surface types (not just on roads), like ships etc. Instead of a radar, also other sensor types, e.g., LiDAR systems may be used, either alone or in combination with a radar.

Figure 1B:
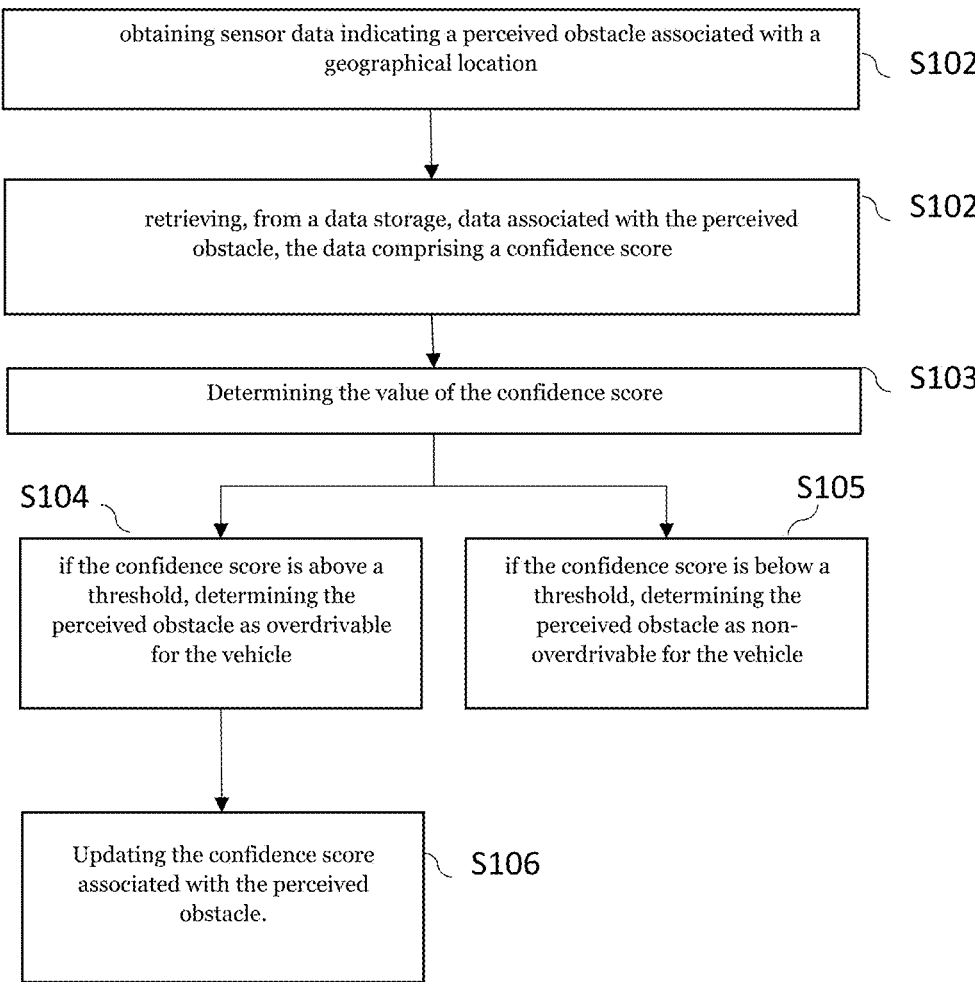
FIG. 1B shows a method for determining a drivable path for a vehicle according to an aspect of the invention.

In FIG. 1b, a method for determining a drivable path for a vehicle during a ride is shown.

In this embodiment in step S101, the vehicle obtains, from a sensor, sensor data indicating a perceived obstacle associated with a geographical location. The sensor may be a radar-based or LiDAR-based sensor.

Radar data typically indicates a velocity and a geographical location of an object relative to the velocity/geographical location of the radar sensor/the vehicle comprising the radar sensor. Based on the sensor data it may be determined that an object in the surrounding of the vehicle exists, which may either be overdrivable or non-overdrivable.

Based on the sensor data, the characteristics including the dimensions (size, height, shape etc.) of the perceived obstacle may be determined. The characteristics of the perceived obstacle may be indicative of one or more of a type of the obstacle, a shape of the obstacle, the dimensions of the obstacle, a height of the obstacle, a collision probability and/or a sensor signature for identifying the perceived obstacle based on the sensor data.

Furthermore, a zone of the perceived obstacle may be determined. The zone may resemble the area/region the perceived obstacle occupies. The zone may be a two-dimensional area on top of a surface, such as a road, or a three-dimensional region on top of the surface extending in a direction away from the surface, like a traffic light or sign.

Based on the sensor data, data from a data storage is retrieved, which is associated with the perceived obstacle (S102). The data is referring to the geographical location of the perceived obstacle and comprises a confidence score. The confidence score may indicate a probability whether the perceived obstacle is actually overdrivable or not.

The data set may further include characteristics (and in particular the dimensions) of the perceived obstacle. The data may be obtained from a storage allocated on the vehicle, and/or from a cloud storage.

Then, in step S103, the value of the confidence score may be determined. If the confidence score is above a threshold, the perceived obstacle may be considered as overdrivable, e.g., as drivable area for the vehicle (S104). The confidence score may be increased if the vehicle drives over the zone/area of the perceived obstacle. For example, if the vehicle drives over the area/zone and it is determined that a collision did not occur, the confidence score may be increased. The updated confidence score may then be stored in the storage as data for further usage (S106). The threshold may be increased only slightly such that the vehicle has to drive over the zone for a certain number of times until the confidence score clearly expresses that the perceived obstacle is actually overdrivable. However, if the confidence score is below the threshold, the perceived obstacle may be determined as non-overdrivable (S105).

It is to be understood that the threshold may be set to control the reliability requirements. The higher the threshold, the more reliable the false positive detection is. In other words, the higher the threshold, the safer is the conclusion or assumption that a perceived obstacle can actually be overdriven.

In an example, initially, the data storage may not contain any entries. In this example, information related to the perceived obstacle may be stored in the storage. Initially, the confidence score is set below the threshold, such that the corresponding perceived obstacle is considered non-overdrivable. Once the vehicle drives at a similar geographical location, the geographical location of the vehicle may be obtained and used to identify corresponding data in the data storage. Once corresponding data is identified, the confidence score for the perceived obstacle may be obtained from the data storage. In this example, the confidence score may still be low, as the vehicle is in the geographical location only for the second time. Accordingly, the perceived obstacle may still be identified as non-overdrivable.

However, if the vehicle drives over the perceived obstacle (over its geographical location), and it is thereby determined that the perceived obstacle is overdrivable, the confidence score associated with the perceived obstacle may be increased and stored with the information related to the perceived obstacle in the storage. That is, if it is determined that the perceived obstacle is likely a non-overdrivable obstacle previously stored in the storage, the corresponding data may be updated accordingly. If it is determined that no information (specifically a confidence score) for the perceived obstacle has been stored in the data storage, a new data set including the corresponding information may be created and stored.

By updating/storing the data set, the characteristics, the geographical location and the corresponding confidence score may be updated/corrected/made more exact.

In some embodiments, the above method is executed using an artificial intelligence (AI) engine. For example, the AI engine may determine an obstacle in the surrounding of the vehicle as non-overdrivable, the characteristics including the dimensions, the geographical location and/or the zone may be determined. Furthermore, or alternatively, the AI engine may also be used for the identification of the data associated with the zone, in particular, in examples where a plurality of data sets are associated with one zone. In this example, the AI engine may determine a probability with which the characteristics/dimensions stored in the respective data sets correspond to the perceived obstacle.

In the following, various implementations of the above method for determining a drivable path for a vehicle during a ride are described with reference to FIGS. 2 to 5.

Figure 2:
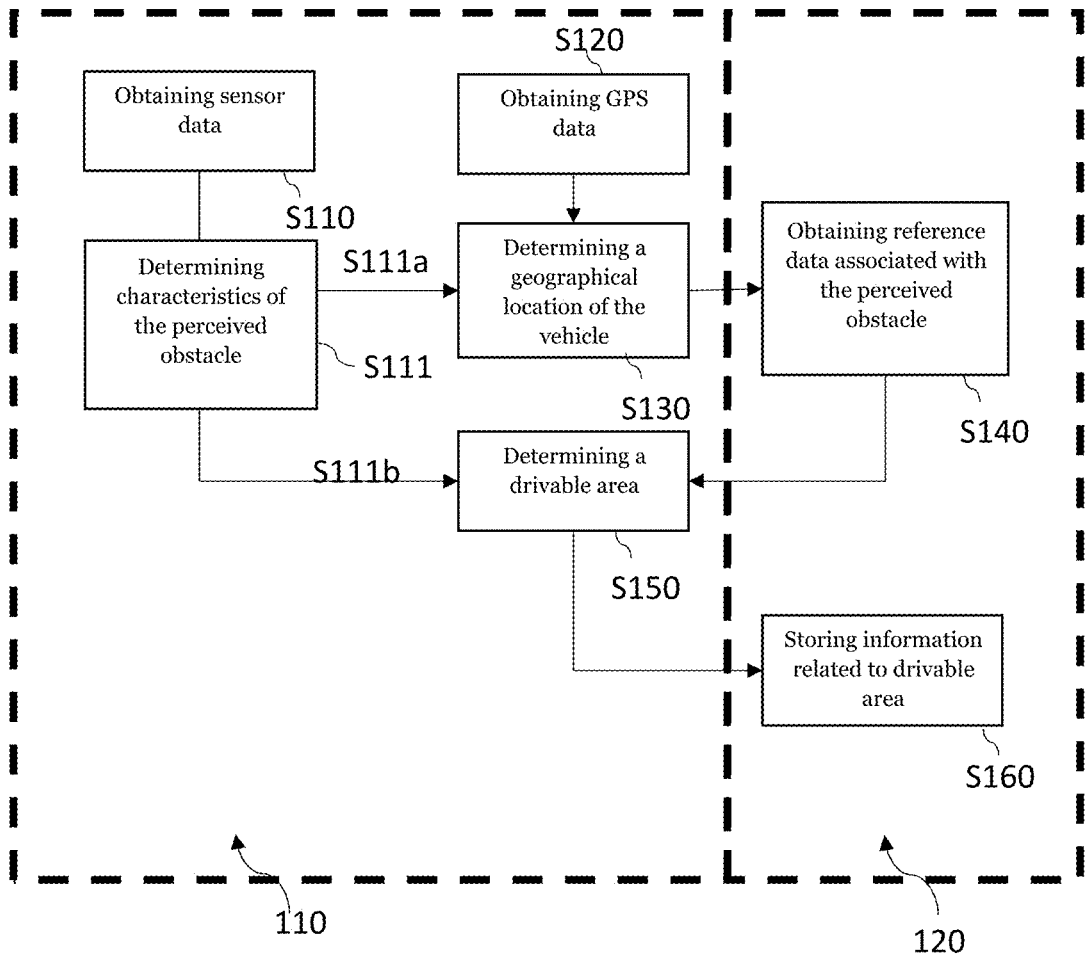
FIG. 2 shows a method for determining a drivable path for a vehicle according to a further aspect of the invention.

1$^{st}$ Implementation of the Method for Determining a Drivable Area for a Vehicle In FIG. 2 a various implementation of the method for determining a drivable path for a vehicle is shown.

In this embodiment in step S110, the vehicle obtains sensor data, such as from a radar sensor, associated with a perceived obstacle in a surrounding of the vehicle. Based on this data, the zone associated with a geographical location, i.e., the area occupied by the perceived obstacle is determined.

Based on the obtained sensor data, in step S111, the characteristics of the perceived obstacle may be determined. For example, it may be determined based on one or more of the size, the structure and the geographical location of the perceived obstacle, that the obstacle is a certain object or structure. The characteristics of the obstacle may be determined using object-detection and/or semantic segmentation (SemSeg), such as using an artificial intelligence, AI, engine 110 (a machine learning approach).

Based on the characteristics of the obstacle, it may be determined whether the obstacle appears overdrivable for the vehicle (the vehicle may drive over the perceived obstacle without causing a collision) or may cause a collision with the vehicle. Moreover, the characteristics may also indicate that the perceived obstacle is, for example, another vehicle, a road, road markings, a building, an object, such as a traffic light, traffic signs, or an item on the road/close to the road, and/or any object or structure a vehicle comes across during operation.

Some obstacles may be determined as a landmark S111a, whereas other obstacles may be determined as traffic objects S111b. The landmarks may be used for determining the current geographical location of the vehicle, whereas the traffic objects may be used for determining the drivable area. Typically, landmarks are stationary features, such as buildings, roads, road signs and road markings, while traffic objects are typically both, moving objects and stationary objects. Nevertheless, some landmarks may also be considered traffic objects and be used for determining the drivable area. That is, while it may be difficult to determine the current geographical location based on another moving feature, such as a car, determining the drivable area based on a landmark, such as a building or a road sign may be crucial.

In addition to the sensor data obtained from the sensor, such as the radar, the vehicle may also obtain global satellite data, such as GPS, GALILEO or GLONASS data, associated with the vehicle S120. The following examples/embodiments will be described with reference to GPS data, however, as set forth above, any other global navigation satellite system may be used additionally/alternatively (such as GLONASS etc.). Based on the GPS data, in step S130, a current geographical location of the vehicle may be determined. Typically, GPS data allows a localization of a vehicle with an accuracy of 2 m, or oven more precise.

Based on the GPS data associated with the vehicle, the geographical location of the perceived obstacle may be determined based on the GPS data associated with the vehicle and/or the sensor data (e.g. according to radar-based localization). That is, since the sensor data may indicate the relative geographical location of the perceived obstacle to the vehicle and the current geographical location of the vehicle is obtained from the GPS data, the geographical location of the perceived obstacle is derivable from this information. Once the geographical location of the perceived obstacle in the environment is determined, the characteristics of the perceived obstacle may be stored in a storage, in association with the (determined) geographical location of the perceived obstacle. The storage may be a physical storage, comprised by the vehicle, or a cloud or remote storage accessible by the vehicle by using wireless data communication techniques.

Storing the characteristics of the perceived obstacles with their respective geographical locations also allows to improve the determination of the current geographical location of the vehicle. The step of determining the current geographical location of the vehicle S130, according to an embodiment, is described with reference to FIG. 3. In the embodiment shown in FIG. 3, the precision of the GPS-based localization (or other global navigation satellite-based systems) can be enhanced by also considering radar data and/or sensor data from other domains (such as LiDAR-based data or sensors considering velocity, time and/or steering inputs etc.).

In step S210, the sensor data associated with the surrounding of the vehicle is obtained from the sensor. In step S220, GPS data associated with the vehicle is obtained. Based on the sensor data, the characteristics of the perceived obstacle may be determined (S230). Based on the characteristics of the perceived obstacles, some of them may be determined as landmarks, as described above. Based on the GPS in step S240, the geographical location of the vehicle may be determined. In step S250, the determined landmarks and the determined geographical location of the vehicle may then be compared with stored landmarks (characteristics of one or more obstacles) associated with a similar geographical location, stored in the storage. Based on the comparison, in step S260, the exact current geographical location of the vehicle may be determined, as compared with a determination based on only the GPS data. That is, the determination based on the sensor data and the GPS data achieves an accuracy of around 0.5 m (as compared to the 2 m of approach based on only GPS). Since the improved determination of the current geographical location requires stored obstacle information (geographical location and/or characteristics of the obstacle), the initial determination of the current geographical location of the vehicle in step S130 in FIG. 2 relates on GPS data, wherein subsequent determinations of the current geographical location in the same environment can be optimized as shown in FIG. 3 (Steps S120 and S130 can be replaced by the steps of FIG. 3). While the enhanced determination of the current geographical location of the vehicle is described based on GPS data and radar-based data, other types of data may be used. For example, instead of using GPS data, other global navigation satellite data may be used, and instead of using the radar-based data, LiDAR-based data, or data based on the velocity of the object, a certain amount of time, and/or steering inputs may also be considered to enhance the determination of the current location of the vehicle.

Returning to FIG. 2, after the current geographical location of the vehicle is determined in step S130, in step S140, a data set associated with the current geographical location of the vehicle is obtained from a storage. The storage may be the same storage that may be used for determining the current geographical location, or a different storage. Similar to the storage used in step S130, the storage may be a physical storage located on the vehicle or a cloud storage accessed by the vehicle by using wireless transmission.

In step S150, a drivable area may be determined based on the obtained sensor data and the obtained data set associated with the perceived obstacle, as described above with reference to FIG. 1b.

Subsequently, in step S160, the information related to the determined drivable area may be stored in the storage, or any other storage suitable for storing such information. That is, the information may be stored in a storage comprised by the vehicle, or a cloud-based storage. In addition to the determined drivable area, the characteristics of the perceived obstacle in the environment of the vehicle may also be stored, together with the corresponding geographical location of the perceived obstacle. The characteristics stored in this step may also include information related to a false positive determination of a characteristic. That is, if a characteristic of the perceived obstacle indicates a collision, but the vehicle did over-drive the perceived obstacle, the perceived obstacle may be marked as false positive, and the corresponding confidence score may increase.

In some embodiments, all the information obtained by the sensor data and the comparison with the data set may be saved in the storage. In other embodiments, only part of the information obtained by the sensor data and the comparison with the data set may be stored in the storage. Furthermore, different information may be stored in different storages. That is, for example, in information related to a recurring route taken by the vehicle may be stored locally, on a storage comprised by the vehicle, whereas all information or certain other aspects of the information may be stored in a cloud storage connected to the vehicle via wireless communication.

By using the confidence score stored in the data storage, false positives in the drivable path and/or area determination may be avoided. For example, in a drivable path determination based only on the sensor data, perceived obstacles that are over-drivable, such as a crack in a road, may be determined as a non-overdrivable obstacles that will cause a collision. Accordingly, the drivable path determination based on only the sensor data would determine the path such that the crack is avoided.

In addition to the above, further safety mechanisms may be in place. For example, in another embodiment, in step S150, a drivable area/path may only be suggested. This suggested path may then be compared with a vision-based detection, such as a LiDAR-based detection. If the LiDAR-based detection confirms that the perceived obstacle appears over-drivable, the drivable area may be determined based on the LiDAR-based object detection and the suggested path. In an example, where the LiDAR-based detection indicates that the perceived obstacle causes a collision, the suggested drivable area/path is disregarded and the drivable area/path is determined according to the LiDAR-based detection and the characteristics determined based on the sensor data (here, the sensor may be a radar), and the path is determined such that the perceived obstacle is avoided. By introducing the vision-based determination late in the method the functional safety of the determination increases, as both approaches determine and characterize the perceived obstacle individually (redundancy increases). The vision-based detection may be used for detection and characterizing objects or for determining a drivable area/path that may then be compared with the suggested drivable area/path and discrepancies may be considered. For example, in a case of a discrepancy between the vision-based determination and the suggested drivable area/path, a combined path avoiding all potential collisions of the respective approaches may be considered as the drivable area/path.

Nevertheless, in some embodiments, the vision-based approach may also be considered earlier. For example, in step S150, in addition to the sensor data (such as radar data) and the data set, vision data obtained by a vision-based sensor, such as the LIDAR may be used to determine the drivable area.

Figure 4:
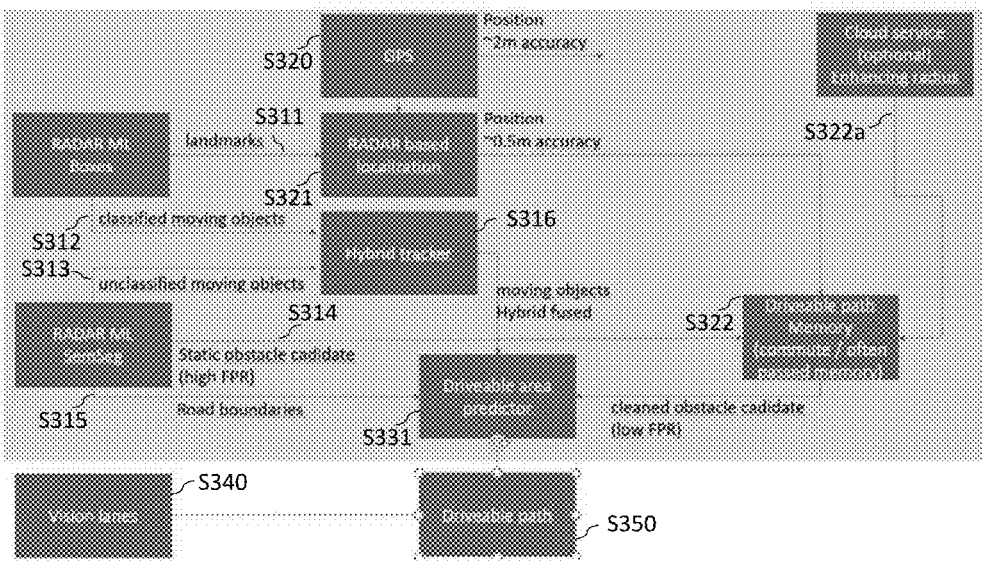
FIG. 4 shows a flow chart of an implementation of the method for determining the drivable path for the vehicle.

2<sup>nd</sup> Implementation of the Method for Determining a Drivable Area for a Vehicle In FIG. 4, another various implementation of the above is shown. In this implementation, radar data is used as the sensor data. In a first step (not shown), radar data is obtained. Based on the radar data an object detection algorithm may be used to determine landmarks in the environment of the vehicle (step S311). Simultaneously, in step S312, based on the object detection algorithm, some of the features may be classified as moving objects, such as other vehicles. Furthermore, in step S313, some of the features may be determined as unclassified moving objects based on SemSeg, and in step S314, some of the features are determined as static obstacle candidates, such as hazards, and in step S315, based on the radar data, the roads/road boundaries may be determined using SemSeg. In step S316, the information (geographical location, size, shape, velocity, etc.) related to the classified moving objects and the unclassified moving objects are consolidated and compared to improve the determination of moving objects in the surrounding of the vehicle. Consolidating and comparing the object detection information and the SemSeg information improves the functional security of the object detection and provides redundancy. Furthermore, the combined approach of SemSeg and object detection improves the reliability of the determination of the characteristics (and of the determined drivable area).

In step S320, the GPS data associated with the vehicle is received and the current geographical location of the vehicle is estimated. As descried above, in step S321, the current geographical location of the vehicle may be determined with a higher accuracy by also considering the sensor data (here radar data). In this example, the determined landmarks are compared with stored landmark information (not shown) and the current geographical location of the vehicle is determined with a higher accuracy.

In step S322, the data set is obtained based on the static obstacles determined by the SemSeg in step 314, the current geographical location of the vehicle determined in step S321. The data set may include a suggested drivable area that has been stored in the storage in a previous iteration of the above method. For example, if the current geographical location of the vehicle is situated on a regular/often passed route, such as a commuter route, information related to the drivable area, and particularly to false positives may be stored in the memory. Alternatively, or additionally, in step S322a, the data set may be obtained from a cloud storage in wireless communication with the vehicle.

In Step S331, the suggested drivable area (drivable area predictor) is determined based on the data set obtained in step S322 and one or more of the consolidated information related to the moving objects obtained in step S316, the static obstacles determined in step S314, and the road boundaries determined in step S315.

In step S350, the drivable area is determined by comparing the suggested drivable area obtained in step S331 with a vision-based determination (S340). The individual steps for performing path determination/object detection using the LiDAR will not be described in full detail. While a similar method as performed using radar data may be considered here, other vision-based detections known in the art may be considered as well. Even though the suggested drivable area/drivable path may already be sufficiently safe and reliable, the further comparison with the vision-based determination further increases the safety of the determination.

Determining the Drivable Area without an Initial Data Set

Figure 5:
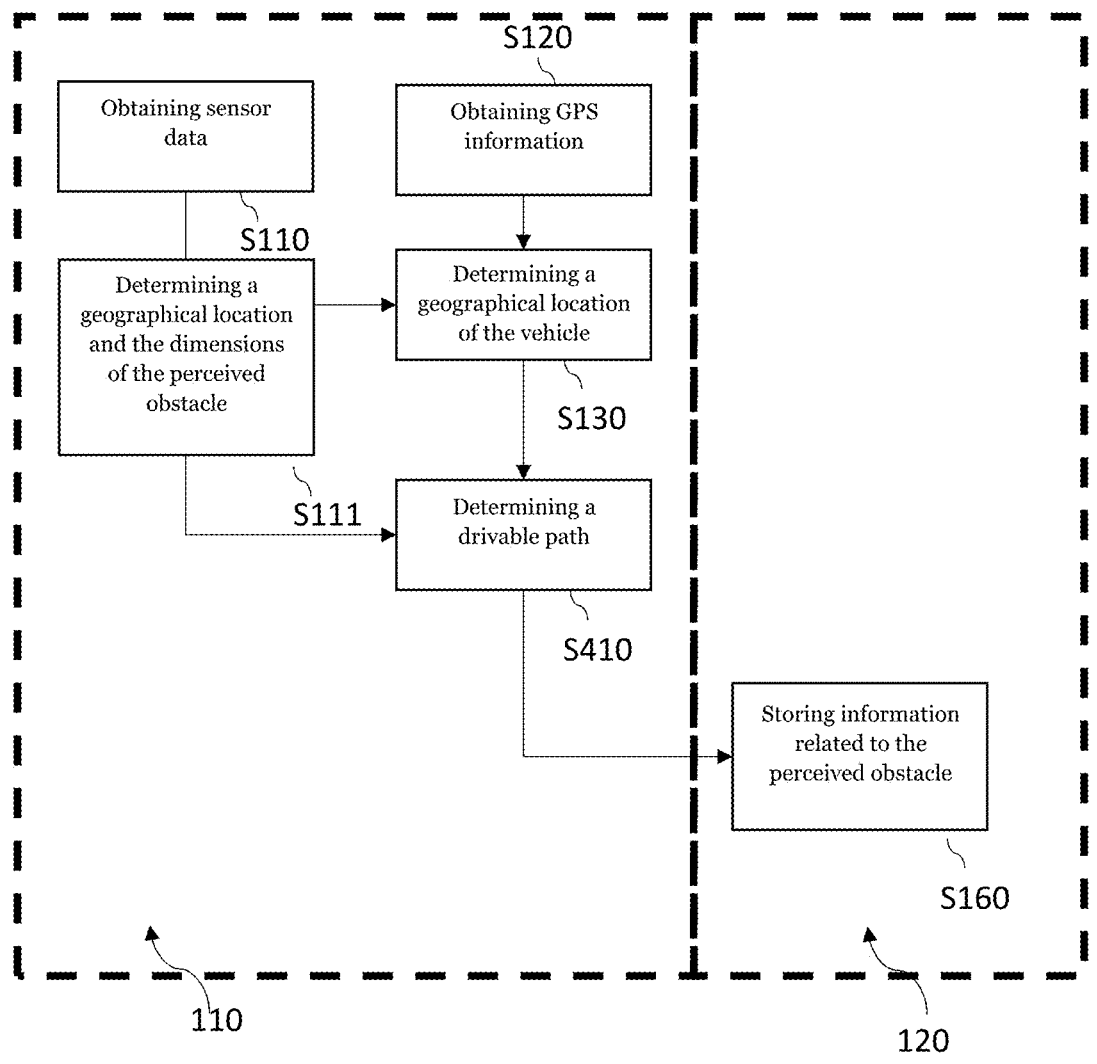
FIG. 5 shows a method for determining the drivable path for the vehicle according to another aspect of the invention.

All of the above embodiments relate to examples, where a data set was already available. FIG. 5 shows an embodiment, where data set is not available initially.

In FIG. 5, steps S110 to S130 are performed as described with reference to FIG. 1b. However, in step S410, instead of determining the drivable area/path based on the sensor data and the data set, the path the vehicle took initially is determined and considered as drivable area/path. This drivable area/path is then stored in the storage (S160) and made available for the future. In addition, the information related to the determination of the current geographical location of the vehicle may also be stored in the storage. For example, information related to landmarks, road features, etc. may also be stored initially. In particular, any obstacles on or close to the road/path may be determined and the corresponding interaction of the vehicle with the perceived obstacles may be determined. For example, it may be determined that the vehicle drove over a perceived obstacle. In this case, the information related to the perceived obstacle is stored with a higher confidence score as information related to another perceived obstacle the vehicle did not interact with/drove over.

A typical use case for the above implementations is a daily commuting route. During the initial ride along the commuting route, the sensor data may be obtained and the characteristics of the perceived obstacles (geographical location, size, shape, type etc.) may be determined and stored in the storage. Furthermore, the path taken by the vehicle may be recorded and considered as a drivable area/path and stored in the storage. The next time the vehicle takes the commuting route, the methods described above may be applied. In other embodiments, other vehicles have already taken this route and the data set may be obtained from the cloud storage.

Any of the above-described methods, implementations and/or use cases may be adapted/improved by incorporating any of the following:

In an aspect, in step S160, a predetermined time span associated with the stored data may be set. If the predetermined time span expires, i.e., the data set was not used for determining the drivable area/path during the predetermined times span, the data set may be deleted from the storage. If the predetermined time span is not expired and data set associated with the current geographical location of the vehicle is used for determining the drivable area/path, the data set is maintained in the storage, the time span associated with the data set is significantly increased.

In another aspect, a minimum number of journeys may be defined. For example, it may be defined that the feature characterization based on the sensor data (geographical location, size, shape, velocity etc.) may only be overridden after the vehicle was in the current geographical location for a certain number of times. In one example, the vehicle must have been in the current geographical location, or at least close to the current geographical location at least two or more times until a perceived obstacle is characterized as a false positive.

Moreover, the above-described method may be implemented in an apparatus, which may be comprised by a vehicle. The vehicle may be a car, a bus, a truck, a ship, a motorbike or the like.

The above methods, implementations and use cases may be embodied in an ADAS. By applying the above method in an ADAS, the ADAS may perform the determination of the drivable area/path for the vehicle, as described above. Accordingly, the vehicle assistance system may trigger one or more actions. Such actions may be any action performed by ADAS, in particular, in view of the determined drivable area/path. That is, the ADAS may determine an operating instruction for the vehicle based on the determined drivable area/path, affecting the function of the ADAS such as one or more of: displaying the drivable area on a display of the vehicle, adapting a vehicle path planning, triggering a warning, and/or affecting control of the vehicle during driving.

Figure 6:
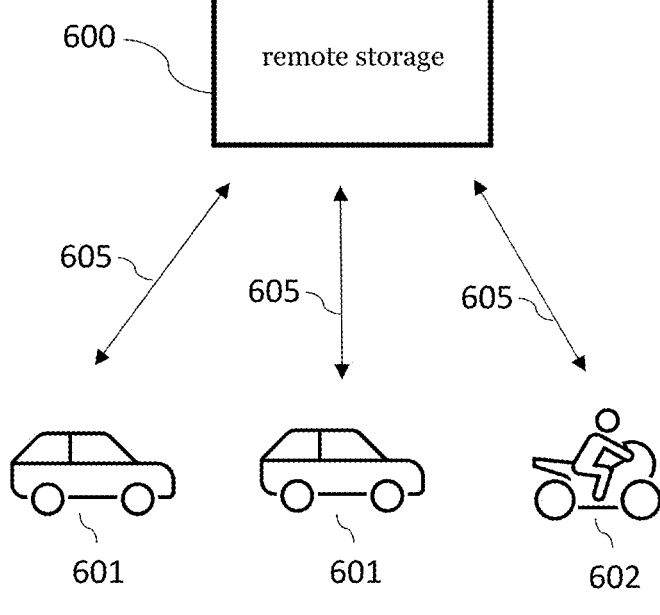
FIG. 6 shows a remote storage accessible by vehicles according to an aspect of the invention.

FIG. 6 depicts a situation in which a plurality of vehicles in terms of cars 601 and a motorbike 602 are connected by using wireless communication links 605 to a remote storage 600, for example a remote server or a remote cloud storage. The data associated with perceived obstacles may be stored to and/or retrieved from the remote storage 600. Such a system architecture may allow sharing the data, including the confidence score, the geographical location and/or the other characteristics of a perceived obstacle among a plurality of traffic participants of a plurality of vehicles 601, 602. In addition, the confidence score may then also be influenced by a plurality of involved vehicles, which may lead to a more reliable confidence score or to a faster increase of a confidence score if a perceived obstacle is actually non-overdrivable.

The method according to the present invention may be implemented in terms of a computer program which may be executed on any suitable data processing device comprising means (e.g., a memory and one or more processors operatively coupled to the memory) being configured accordingly. The computer program may be stored as computer-executable instructions on a non-transitory computer-readable medium.

Embodiments of the present disclosure may be realized in any of various forms. For example, in some embodiments, the present invention may be realized as a computer-implemented method, a computer-readable memory medium, or a computer system.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. In particular, with reference to the appended claims, features from dependent claims may be combined with those of the independent claims and features from respective independent claims may be combined in any appropriate manner and not merely in the specific combinations enumerated in the appended claims.

CONCLUSION

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for determining a drivable path for a vehicle during a ride, the method comprising:

obtaining sensor data indicating a perceived obstacle associated with a geographical location;

retrieving, from a data storage, data associated with the perceived obstacle, wherein the data includes a confidence score;

in response to the confidence score being above a threshold, determining the perceived obstacle as overdrivable for the vehicle; and incrementally increasing the confidence score in the data storage in response to at least one of the perceived obstacle being overdriven or the obtained sensor data indicating that the perceived obstacle is overdrivable.

2. The method of claim 1 further comprising, in response to the confidence score being below the threshold, determining the perceived obstacle as non-overdrivable for the vehicle.

3. The method of claim 1 further comprising:

determining a set of characteristics of the perceived obstacle based on the sensor data, wherein the set of characteristics includes at least one of:

a type of the perceived obstacle, a shape of the perceived obstacle, a size of the perceived obstacle, a distance between the vehicle and the perceived obstacle, a height of the perceived obstacle, or a geographical location of the perceived obstacle.

4. The method of claim 3 further comprising at least one of storing or updating the set of characteristics of the perceived obstacle in the data storage.

5. The method of claim 3 wherein the geographical location of the perceived obstacle is determined based on a current geographical location of the vehicle.

6. The method of claim 5 wherein the geographical location of the perceived obstacle is determined based on at least one of global navigation satellite information or radar-based localization.

7. The method of claim 3 further comprising at least one of:

determining a drivable path, including the geographical location of the perceived obstacle, in response to a determination that the perceived obstacle is overdrivable; or determining the drivable path, excluding the geographical location of the perceived obstacle, in response to a determination that the perceived obstacle is non-over-drivable.

8. The method of claim 7 wherein determining the drivable path is based on a drivable pass predictor.

9. The method of claim 7 further comprising:

determining an operating instruction for the vehicle based on the determined drivable path affecting a function of a vehicle assistance system, wherein the function includes at least one of:

displaying the determined drivable path on a display of the vehicle, triggering a warning, or affecting control of the vehicle.

10. The method of claim 1 wherein the data storage is at least one of an internal storage of the vehicle or a remote storage accessible by the vehicle.

11. The method of claim 10 wherein the data storage includes cloud storage accessible by the vehicle.

12. The method of claim 1 wherein obtaining sensor data includes identifying the perceived obstacle using at least one of an object detection or semantic segmentation algorithm.

13. The method of claim 12 wherein identifying the perceived obstacle is performed using an artificial intelligence (AI) engine.

14. An apparatus comprising:

storage hardware configured to store instructions; and at least one processor configured to execute the instructions, wherein the instructions include:

obtaining sensor data indicating a perceived obstacle associated with a geographical location, retrieving, from a data storage, data associated with the perceived obstacle, the data comprising a confidence score, in response to the confidence score being above a threshold, determining the perceived obstacle as overdrivable for a vehicle, and incrementally increasing the confidence score in the data storage in response to at least one of the perceived obstacle being overdriven or the obtained sensor data indicating that the perceived obstacle is overdrivable.

15. A system comprising:

the apparatus of claim 14; and a remote storage accessible by the apparatus.

16. A vehicle comprising:

the apparatus of claim 14; and a radar.

17. A system comprising:

the vehicle of claim 16; and a remote storage accessible by the vehicle.

18. A non-transitory computer-readable medium comprising instructions implementing:

obtaining sensor data indicating a perceived obstacle associated with a geographical location;

retrieving, from a data storage, data associated with the perceived obstacle, the data comprising a confidence score;

in response to the confidence score being above a threshold, determining the perceived obstacle as overdrivable for a vehicle; and incrementally increasing the confidence score in the data storage in response to at least one of the perceived obstacle being overdriven or the obtained sensor data indicating that the perceived obstacle is overdrivable.

\* \* \* \* \*